(12) United States Patent
Sato

(10) Patent No.: US 6,239,919 B1
(45) Date of Patent: May 29, 2001

(54) INTERNAL FOCUSING TELEPHOTO LENS HAVING HIGH SPEED APERTURE RATIO

(75) Inventor: Susumu Sato, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/499,439

(22) Filed: Feb. 7, 2000

Related U.S. Application Data

(63) Continuation of application No. 09/193,045, filed on Nov. 16, 1998, now abandoned.

(30) Foreign Application Priority Data

May 14, 1998 (JP) .................................. 10-131521

(51) Int. Cl.$^7$ .................................................. G02B 15/14
(52) U.S. Cl. ........................... 359/684; 359/689; 359/690
(58) Field of Search ..................... 359/676, 683, 359/684, 686, 689, 690

(56) References Cited

U.S. PATENT DOCUMENTS

| | | | |
|---|---|---|---|
| 4,874,231 | * 10/1989 | Aono | 359/684 |
| 5,136,431 | * 8/1992 | Terasawa et al. | 359/684 |
| 5,323,270 | * 6/1994 | Sato | 359/746 |
| 5,414,562 | * 5/1995 | Ueda | 359/683 |
| 5,438,455 | * 8/1995 | Nakatsuji et al. | 359/748 |
| 5,442,486 | * 8/1995 | Sato | 359/690 |
| 5,490,014 | * 2/1996 | Suzuki | 359/745 |
| 5,610,769 | * 3/1997 | Shoji | 359/745 |
| 5,719,703 | * 2/1998 | Sato | 359/557 |
| 5,745,306 | * 4/1998 | Sato | 359/745 |
| 5,757,555 | * 5/1998 | Sato | 359/684 |

\* cited by examiner

Primary Examiner—Georgia Epps
Assistant Examiner—David N. Spector
(74) Attorney, Agent, or Firm—Vorys, Sater, Seymour and Pease LLP

(57) ABSTRACT

A large-relative-aperture internal focusing supertelephoto lens comprising, in order from the object side:

a first lens group G1 possessing positive refractive power and comprising, in order from the object side, a front group G1F possessing positive refractive power and a rear group G1R possessing positive refractive power of the same order as the aforesaid front group G1F;

a second lens group G2 possessing negative refractive power that carries out focusing as result of movement along an optical axis;

and a third lens group G3 possessing positive refractive power;

wherein the following conditional expressions are satisfied:

$$0.7 < |f1 \cdot f3/(f2 \cdot F)| < 1.3,$$

$$0.4 < |f2 \cdot F1/(f1 \cdot \Phi1)| < 1.0,$$

and $$0.7 < <f1F/f1R < 1.4;$$

where:
f1=Focal length of the aforesaid first lens group G1,
f2=focal length of the aforesaid second lens group G2,
f3=focal length of the aforesaid third lens group G3,
f1F=focal length of the aforesaid front group within the first lens group G1, f1R=focal length of the aforesaid rear group within the first lens group G1,
F focal length of the entire lens system, and
Φ1=effective diameter of the lens surface at the object-most side of the aforesaid first lens group.

15 Claims, 12 Drawing Sheets

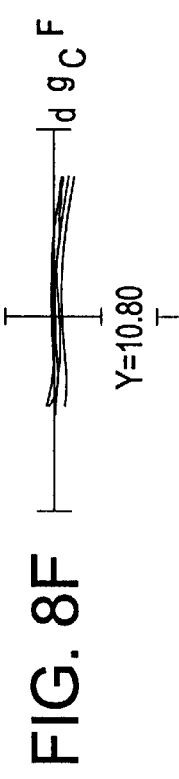
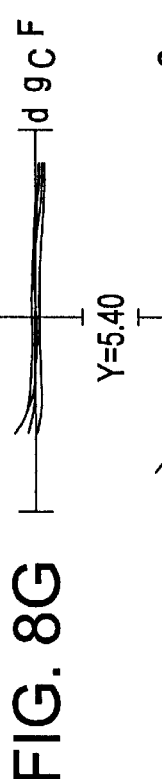
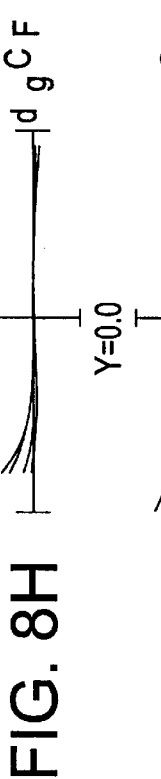
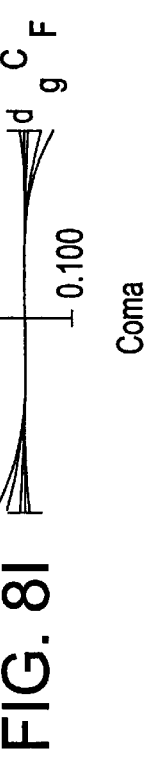
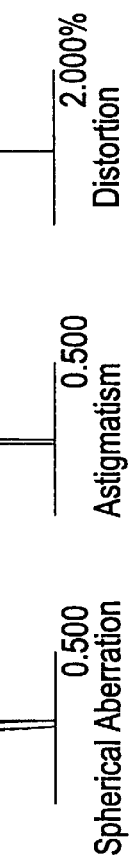
FIG. 8A FIG. 8B FIG. 8C
FIG. 8D
FIG. 8E FIG. 8F FIG. 8G FIG. 8H FIG. 8I

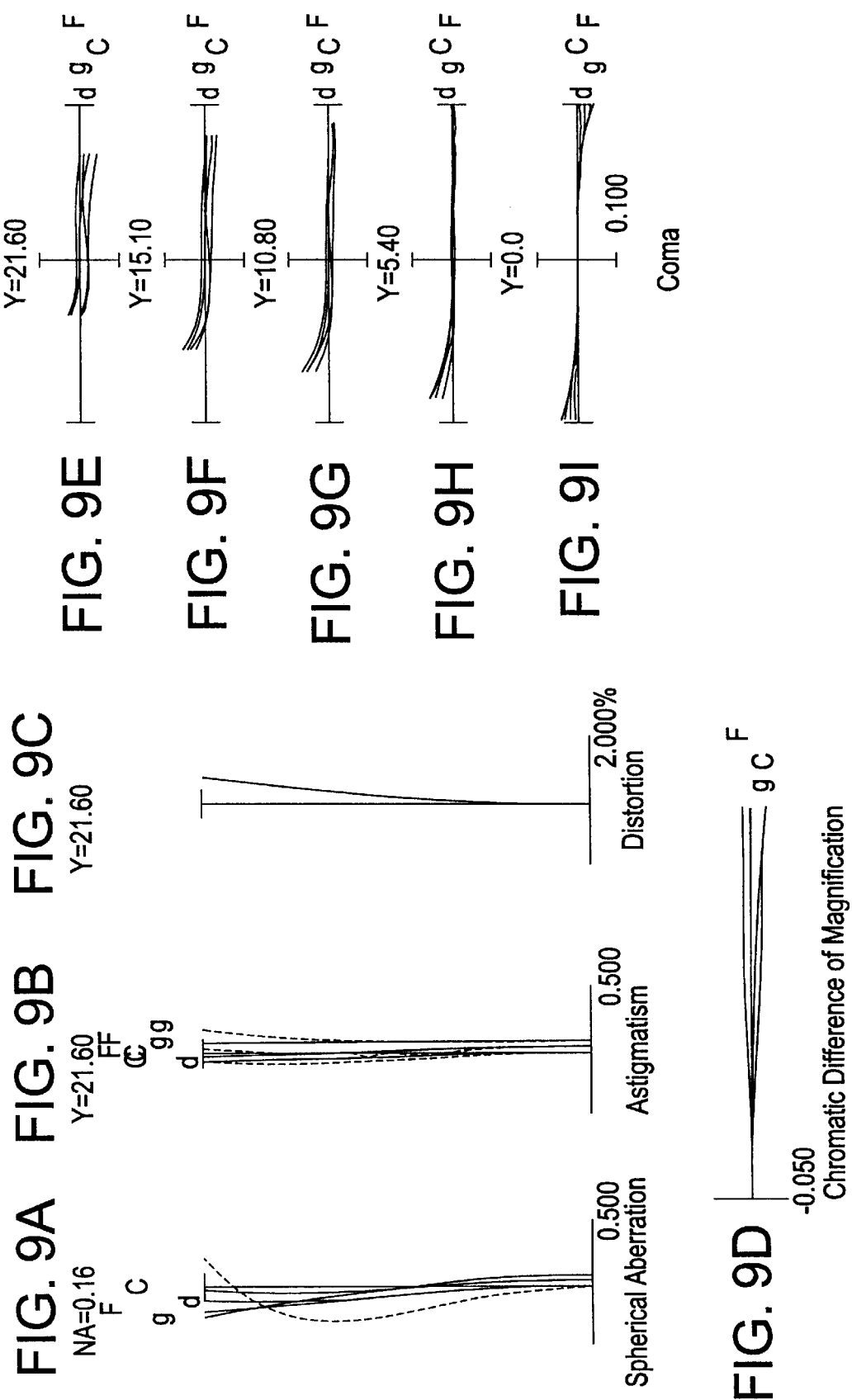

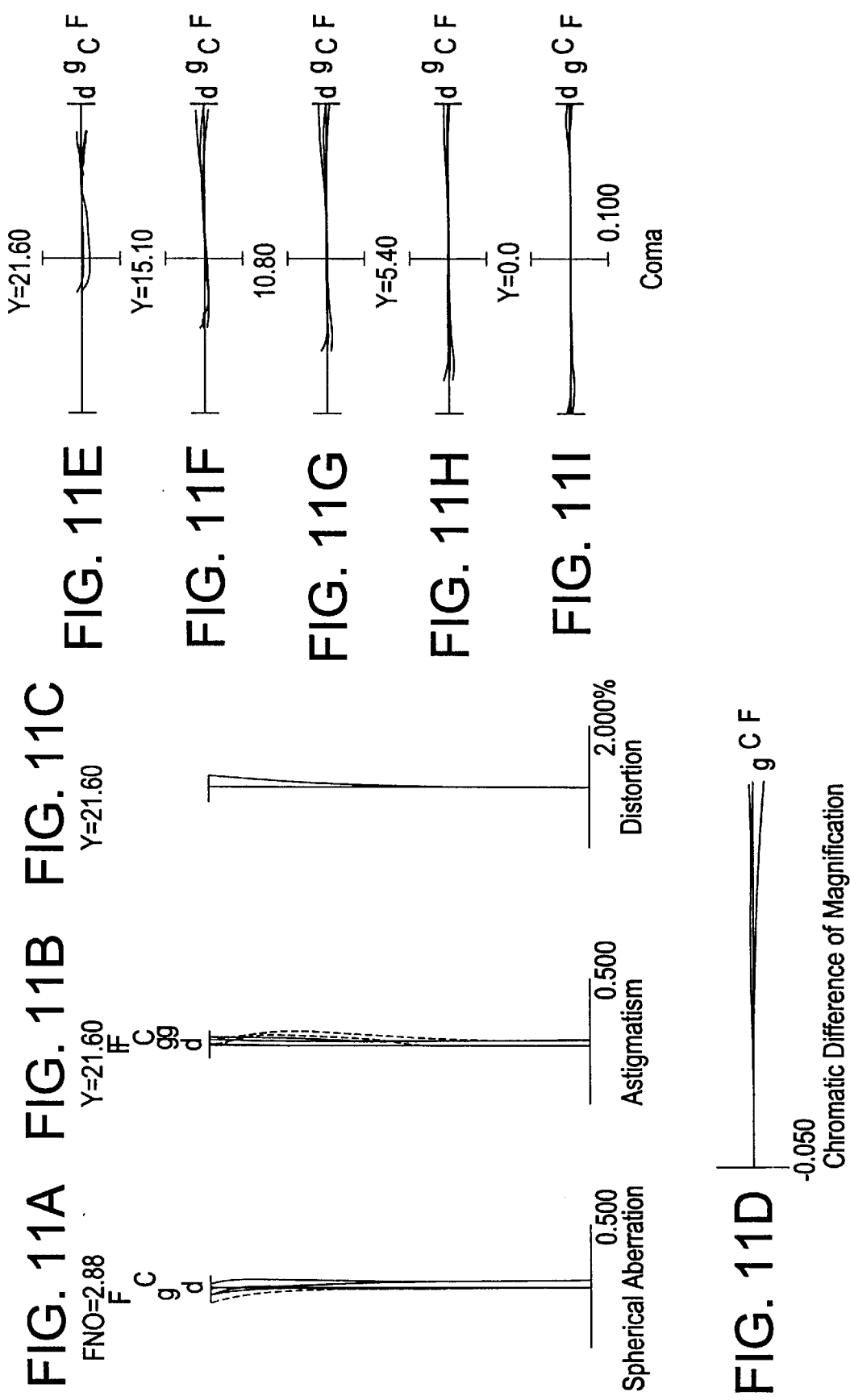

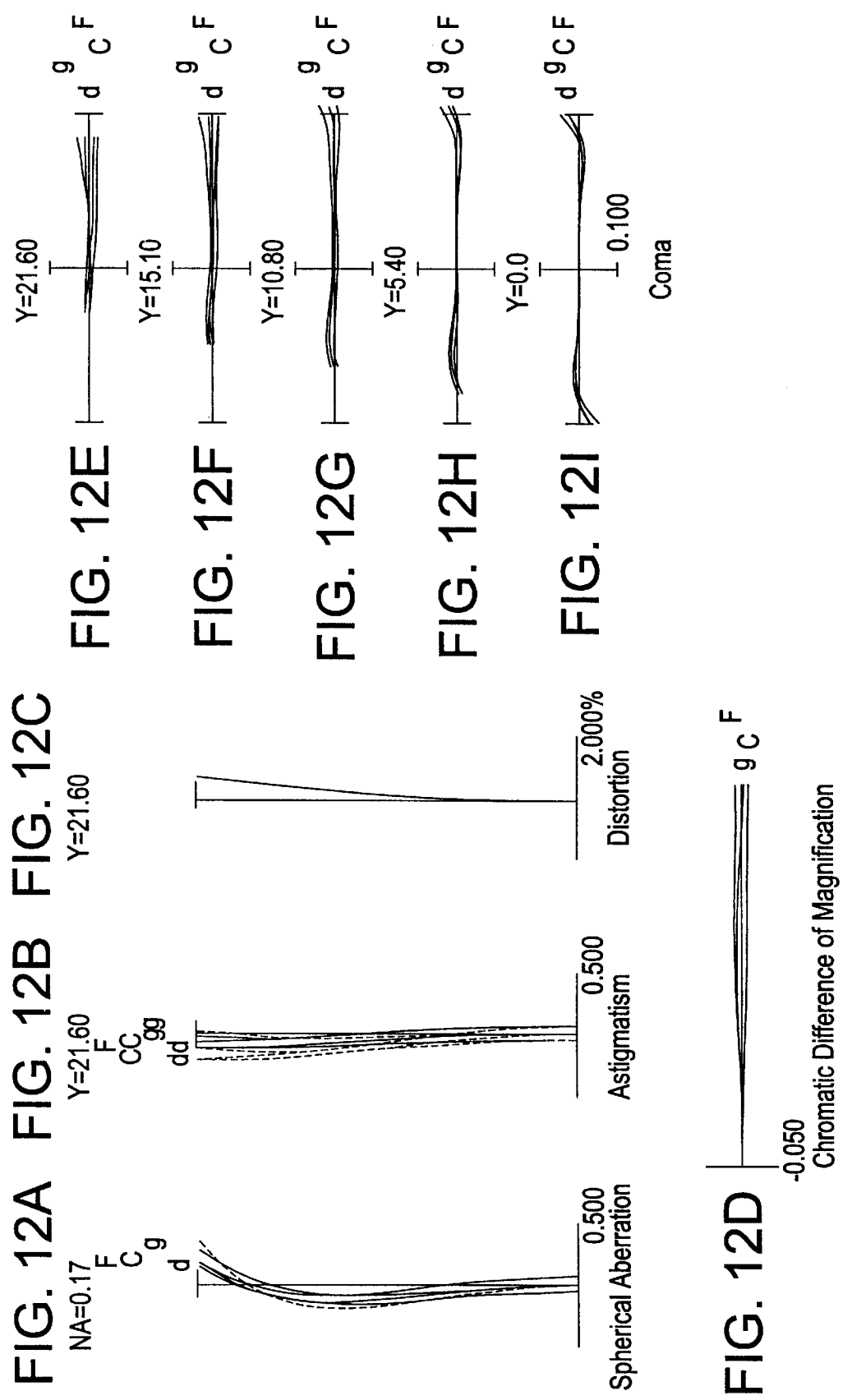

INTERNAL FOCUSING TELEPHOTO LENS HAVING HIGH SPEED APERTURE RATIO

CROSS REFERENCE TO CO-PENDING APPLICATION

This application is a continuation of application Ser. No. 09/193,045 filed Nov. 16, 1998 (abandoned).

BACKGROUND OF THE INVENTION

(1) Field of the Invention

The present invention pertains to a photographic objective lens suitable for use in single-lens reflex cameras, electronic still cameras, and the like, and pertains to a large-relative-aperture internal focusing supertelephoto lens wherein focal length is about 400 mm or greater and F-number is less than about 3.

(2) Background of the Related Art

What is herein referred to as internal focusing is art allowing a photographer to change shooting distance at will (i.e., to focus) from an infinite shooting distance state to a short shooting distance state, without causing a change in the overall length of the lens system, as a result of causing a portion of the lens groups within the lens system to move along the optical axis.

In this type of supertelephoto lens, employed in single-lens reflex cameras, electronic still cameras, and the like, the focusing lens group(s), which move along the optical axis during focusing, have conventionally had large effective diameters.

For this reason, because it has not been possible with conventional supertelephoto lens art to bring down to the same order as that of small-aperture telephoto lenses the effective diameter of the focusing lens group(s) in large-relative-aperture internal focusing supertelephoto lenses wherein focal length is about 400 mm or greater and F-number is about 3 or less, exploitation of commonality between small-aperture telephoto lenses and large-relative-aperture internal focusing supertelephoto lenses has not been permitted with respect to the actuator(s) that drive the focusing lens group(s) and with respect to the hardware structure connecting the actuator(s) and the focusing lens group(s), compelling drastic increases in manufacturing cost. Furthermore, attainment of satisfactory optical performance has also not been permitted.

While Japanese Laid-Open Patent Application (Kokai) No. H8[1996]-327897 is an example of background art directed toward an object similar to that of the present invention, the proposal of this reference is inadequate for purposes of adequately reducing the effective diameter of the focusing lens group(s) while at the same time permitting both long focal length and large relative aperture as does the present invention.

The present invention was conceived to solve such problems as these, its object being to provide a large-relative-aperture internal focusing supertelephoto lens having excellent imaging performance and permitting use of hardware and actuator(s) associated with focusing lens group(s) in cannon with those used in small-aperture telephoto lenses as a result of keeping the effective diameter of the focusing lens group(s) to the same order as that of small-aperture telephoto lenses while maintaining satisfactory optical performance.

SUMMARY OF THE INVENTION

To solve the aforementioned problem, the present invention provides a lens system that is a large-relative-aperture internal focusing supertelephoto lens equipped with, in order from the object side:

a fist lens group G1 possessing positive refractive power and comprising in order from the object side, a front group G1F possessing positive refractive power and a rear group G1R possessing positive refractive power of the same order as the aforesaid front group G1F;

a second lens group G2 possessing negative refractive power that carries out focusing as result of movement along an optical axis;

and a third lens group G3 possessing positive refractive power;

wherein the following conditional expressions are satisfied:

$$0.7 < |f1 \cdot f3/(f2 \cdot F)| < 1.3,$$

$$0.4 < |f2 \cdot F|/(f1 \cdot \Phi 1) < 1.0,$$

and $$0.7 < f1F/f1R < 1.4;$$

where:
f1=Focal length of the aforesaid first lens group G1,
f2=Focal length of the aforesaid second lens group G2,
f3=Focal length of the aforesaid third lens group G3,
f1F=Focal length of the aforesaid front group within the first lens group G1,
f1R=Focal length of the aforesaid rear group within the first lens group G1,
F=Focal length of the entire lens system, and
$\Phi 1$=Effective diameter of the lens surface at the object-most side of the aforesaid first lens group.

BRIEF DESCRIPTION OF DRAWINGS

FIGS. 8A–8I contain curves showing various types of aberration for the third embodiment of the present invention when shooting a subject at an infinite distance.

FIGS. 9A–9I contain curves showing various types of aberration for the third embodiment of the present invention when shooting a subject at the closest focusing distance.

FIGS. 11A–11I contain curves showing various types of aberration for a fifth embodiment of the present invention when shooting a subject at an infinite distance.

FIGS. 12A–12I contain curves showing various types of aberration for a sixth embodiment of the present invention when shooting a subject at the closest focusing distance.

DETAILED DESCRIPTION OF PREFERRED EMBODIMENTS

Figure 1:
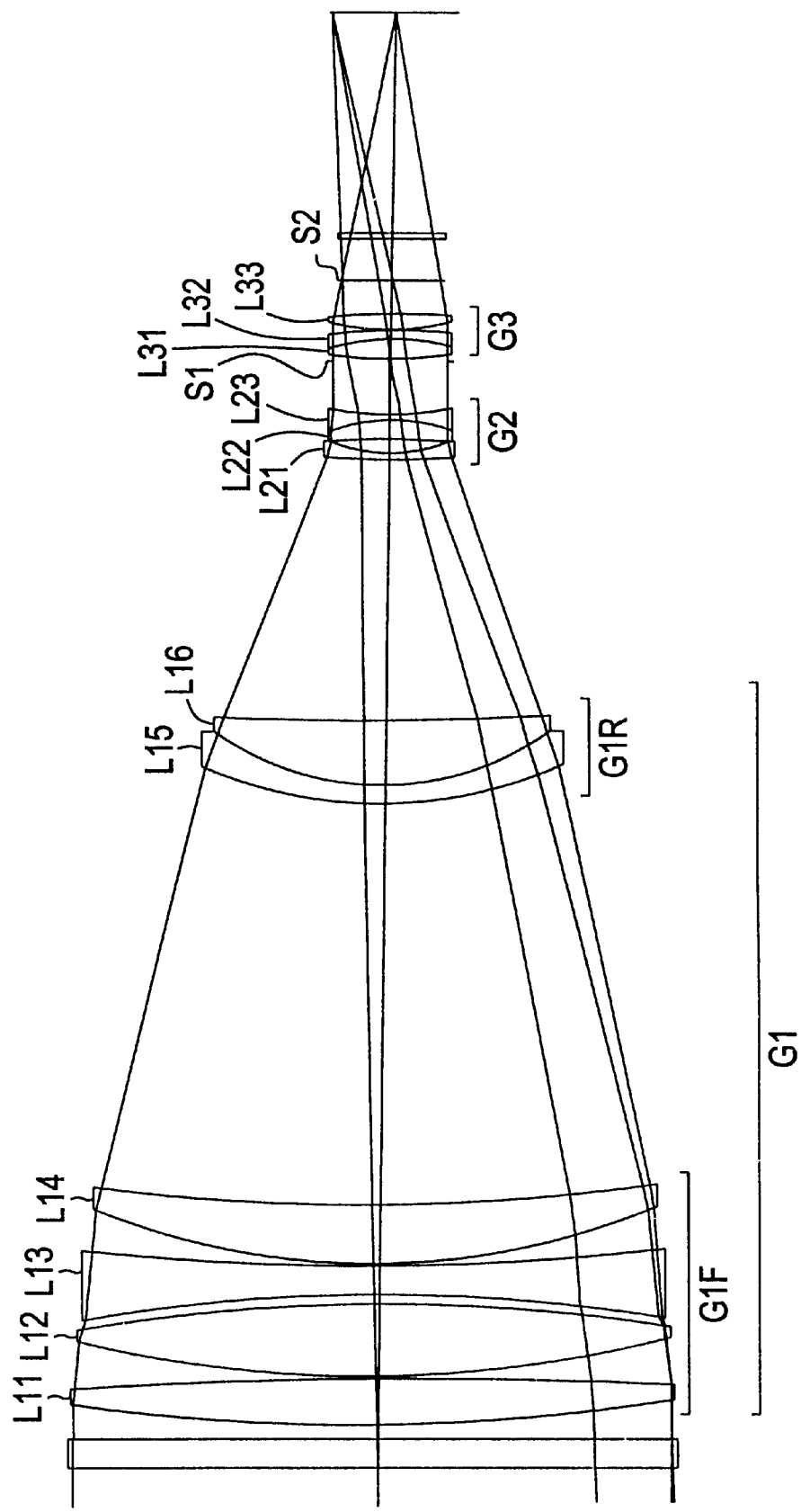
FIG. 1 is a drawing showing the constitution of a first embodiment of the present invention.

The large-relative-aperture internal focusing supertelephoto lens of the present invention is equipped with, in order from the object side, a first lens group G1 possessing positive refractive power, a second lens group G2 possessing negative refractive power, and a third lens group G3 possessing positive refractive power, and is an internal focusing supertelephoto lens wherein focusing is carried out as a result of causing the aforesaid second lens group G2 to move along the optical axis, and the afore said fit lens group G1 comprises in order from the object side, a front group G1F possessing positive refractive power and a rear group G12 possessing positive restive power of the same order as the aforesaid front group G1F.

In order to keep the effective diameter of the focusing lens group(s) to the same order as that of small-aperture telephoto lenses while maintaining satisfactory optical performance, it is preferable that conditional expressions (1) through (3), below, be satisfied:

$$0.7 < |f1 \cdot f3/(f2 \cdot F)| < 1.3 \quad (1)$$

$$0.4 < |f2 \cdot F|/(f1 \cdot \Phi 1) < 1.0 \quad (2)$$

$$0.7 < f1F/f1R < 1.4 \quad (3)$$

where:
  f1=Focal length of the aforesaid first lens group G1
  f2=Focal length of the aforesaid second lens group G2
  f3=Focal length of the aforesaid third lens group G3
  f1F=Focal length of the aforesaid front group G1F within the first lens group
  f1R=Focal length of the aforesaid rear group G1R within the first lens group
  F=Focal length of the entire lens system
  $\Phi 1$=Effective diameter of the lens surface at the object-most side of the aforesaid first lens group Conditional expression (1) is for the purpose of Teducing fluctuation in spherical aberration during short-distance focusing, and indicates ranges for achieving optimal balance among the focal lengths of the respective lens groups and the entire system. In particular, if we consider the situation that exists when the focal length of the third lens group G3 and the focal length of the entire lens system are fixed, conditional expression (1) indicates the range over which the combined focal length of the aforesaid first lens group G1 and the aforesaid second lens group G2 straddles the a focal condition. As a result of such condition, the incident height of a bundle of light rays incident on the third lens group G3, which remains stationary while focusing operations are being carried out, does not easily fluctuate as a result of focusing operations, and fluctuation in spherical aberration during short-distance focusing is reduced. Accordingly, outside of the range defined by the upper limit and lower limit of conditional expression (1), the combined refractive power of the aforesaid first lens group G1 and the aforesaid second lens group G2 becomes too strong, this being undesirable due to the large fluctuation in spherical aberration produced during short-distance focusing. Furthermore, to further reduce fluctuation in spherical aberration during short-distance focusing, it is desirable to employ an upper limit of 1.15 and a lower limit of 0.85.

Furthermore, conditional expression (2) is for the purpose of reducing the effective diameter of the aforesaid second lens group G2, the focusing lens group, while at the same time maintaining satisfactory imaging performance, even when the effective diameter of the aforesaid first lens group G1 is large. Above the upper limit of conditional expression (2), the effective diameter of the aforesaid second lens group G2, the focusing lens group, becomes too large, this being undesirable because it impedes the object of the present invention. Going below the lower limit of conditional expression (2) is undesirable, as this results in a large amount of fluctuation in spherical aberration during short-distance focusing, and in addition, causes coma at the g line ($\lambda$=435.6 nm) to become excessive in the negative direction Moreover, to irter reduce the effective diameter of the aforesaid second lens group G2, the focusing lens group, it is desirable to employ an upper limit of 0.9 at conditional expression (2). Furthermore, to further reduce fluctuation in spherical aberration during short-distance focusing, it is desirable to employ a lower limit of 0.5 at conditional expression (2).

Furthermore, conditional expression (3) is for achieving balance between shortening of the total length of the optical system and satisfactory optical performance. Going above the upper limit of conditional expression (3) is undesirable, as this causes the total length of the optical system to become too large. Going below the lower limit of conditional expression (3) is undesirable, as this results in a large amount of fluctuation in spherical aberration during short-distance focusing, and in addition, causes coma at the g line ($\lambda$=435.6 nm) to become excessive in the negative direction. Moreover, employment of an upper limit of 1.3 and a lower limit of 0.8 at conditional expression (3) permits attainment of even better balance between shortening of the total length of the optical system and satisfactory optical performance.

Next, to achieve even better optical performance, it is preferable in the present invention that the aforesaid front group G1F within the first lens group G1 comprise, in order from the object side, a positive lens component, a positive lens component, and a negative lens component; that the aforesaid rear group G1R within the first lens group G1 comprise a negative lens component and a positive lens component; and that conditional expressions (4) through (6), below, be satisfied:

$$0.2 < Nn1 - Np1 < 0.4 \quad (4)$$

$$65 < vp1 < 100 \quad (5)$$

$$35 < vn1 < 65 \quad (6)$$

where:
  Np1=Average refractive index at the d line ($\lambda$=587.6 nm) of the aforesaid positive lens components of the first lens group G1
  vp1=Abbe number of each positive lens component of the first lens group G1
  Nn1=Average refractive index at the d line of each negative lens component of the first lens group G1
  vn1=Abbe number of each negative lens component of the first lens group Because the present invention is based on a telephoto-type optical system, residual aberration at the first lens group G1 will be magnified, determining final performance. Accordingly, the first lens group G1 when taken alone must display adequate correction for spherical aberration and secondary chromatic aberration.

In addition, conditional expression (4) is for satisfactory correction of spherical aberration at the first lens group G1.

Going above the upper limit of conditional expression (4) is undesirable, as this causes secondary chromatic aberration to become large due to the fact that only selection of g materials of small Abbe number is permitted. Going below the lower limit of conditional expression (4) is undesirable, as this Tesults in a lage amount of spherical aberration bending due to the fact that there is a smaller difference in the refractive indices of convex and concave lenses.

Furthermore, the upper limit of conditional expression (5) is the limiting value for existing optical glasses for use with visible light rays, there being no optical material in existence that is capable of being used if this value is exceeded. Going below the lower limit of conditional expression (5) is undesirable, as this results in inability to completely and adequately correct for secondary chromatic aberration.

Moreover, when considered together with conditional expression (4), the upper limit of conditional expression (6) is the limiting value for existing optical glasses for use with visible light rays, there being no optical material in existence that is capable of being used if this value is exceeded. Going below the lower limit of conditional expression (6) is undesirable, as this results in inability to completely and adequately correct for secondary chromatic aberration.

In addition, to accomplish even better correction of aberration, it is desirable to employ an upper limit of 0.35 and a lower limit of 0.25 at conditional expression (4), to employ a lower limit of 70 at conditional expression (5), and to employ an upper limit of 55 and a lower limit of 40 at conditional expression (6). Moreover, to obtain satisfactory optical performance while still allowing reduction in cost, it is desirable to employ an upper limit of 85 at conditional expression (5).

Next, it is preferable in the present invention that the aforesaid front group G1F within the first lens group G1 comprise, in order from the object side, a positive lens component L11, a positive lens component L12, a negative lens component L13, and a positive lens component L14; that the aforesaid rear group G1R within the first lens group G1 comprise a negative lens component L15 and a positive lens component L16; and that the following conditions be satisfied:

$$1.40 < Np3 < 1.65 \tag{7}$$

$$60 < vp3 < 100 \tag{8}$$

where the third lens group G3 comprises at least one positive lens component, and where:
[Japanese original, page 7]
Np3=Refractive index at the d line (λ=587.6 nm) of each positive lens component of the third lens group G3
vp3=Abbe number of each positive lens component of the third lens group G3

In a telephoto-type optical system such as that of the present invention, optical performance of the first lens group G1 when taken alone contributes greatly to the optical performance of the overall system. Accordingly, provided that the first lens group G1 has been corrected so as to achieve the best possible optical performance, fluctuation in aberration produced as a result of focusing can be reduced through separate and satisfactory correction of the aberration produced by the third lens group G3, which remains stationary during focusing operations.

Conditions for selection of the glass used in the third lens group G3 are therefore set by conditional expressions (7) and (8).

Going above the upper limit of conditional expression (7) is undesirable since only the use of glasses displaying poor secondary chromatic aberration when used in a convex lens is permitted. The lower limit of conditional expression (7) is the limiting value for existing optical glasses for use with visible light rays, there being no optical material in existence that is capable of being used below this value. Furthermore, when considered together with conditional expression (7), the upper limit of conditional expression (8) is the limiting value for existing optical glasses for use with visible light rays, there being no optical material in existence that is capable of being used if this value is exceeded. Going below the lower limit of conditional expression (8) is undesirable since only the use of glasses displaying poor secondary chromatic aberration when used in a convex lens is permitted.

In addition, to obtain even better optical performance, it is desirable to employ an upper limit of 1.55 at conditional expression (7), and to employ a lower limit of 65 at conditional expression (8).

Next, in the present invention, to achieve even better correction of spherical aberration bending, which is likely to be produced by the first lens group, it is desirable that the aforesaid third lens group G3 comprise, in order from the object side, a positive lens component L31, a negative lens component L32, and a positive lens component L33.

However, to achieve reduction in cost, it is desirable that the aforesaid third lens group G3 comprise a cemented positive lens including, in order from the object side, a positive lens component L31 and a negative lens component L32.

Furthermore, where reduction of the weight of the overall optical system is deemed important, it is preferable in the present invention that the aforesaid front group G1F within the first lens group G1 comprise, in order from the object side, a positive lens component L11, a positive lens component L12, and a negative lens component L13; that the aforesaid rear group G1R within the first lens group G1 comprise a negative lens component L14 and a positive lens component L15; that the aforesaid third lens group G3 comprise, in order from the object side, a positive lens component L31, a negative lens component L32, and a positive lens component L33; and that the following conditions be satisfied:

$$1.55 < Np3 < 1.75 \tag{9}$$

$$45 < vp3 < 70 \tag{10}$$

where:
Np3=Refractive index at the d line (λ=587.6 nm) of each positive lens component of the third lens group G3
vp3=Abbe number of each positive lens component of the third lens group G3

On the subject of weight, in a telephoto-type optical system the weight of the first lens group G1 represents most of the weight of the overall optical system. Accordingly, reduction of the weight of the overall optical system can be achieved if the first lens group G1 comprises a small number of glass elements. However, since constituting the first lens group G1 from a small number of glass elements will result in production of a large amount of spherical aberration bending, correction of spherical aberration must in this case be carried out at the third lens group G3, which remains stationary during focusing operations. A triplet constitution may therefore be employed at the aforesaid third lens group G3 to correct for spherical aberration, image plane distortion, and secondary chromatic aberration. In addition, conditions for selection of the glass used in the third lens group G3 are set by conditional expressions (9) and (10).

It is undesirable that the value at conditional expression (9) exceed the upper limit thereof since only the use of glasses displaying poor secondary chromatic aberration when used in a convex lens is permitted. It is undesirable that the value at conditional expression (9) go below the lower limit thereof since doing so would cause increased occurrence of coma and deterioration in flatness of the image plane.

Furthermore, when considered together with conditional expression (9), going above the upper limit of conditional expression (10) is substantially the limiting value for existing optical glasses for use with visible light rays, as the optical materials in existence that are capable of being used grow few above this value. Going below the lower limit of conditional expression (10) is undesirable since only the use of glasses displaying poor secondary chromatic aberration when used in a convex lens is permitted.

In addition, to obtain even better optical performance, it is desirable to employ a lower limit of 1.60 at conditional expression (9), and to employ an upper limit of 65 and a lower limit of 50 at conditional expression (10).

Embodiments

Below, are described embodiments of the present invention based on the attached drawings. In each of the embodiments, the large-relative-aperture internal focusing supertelephoto lens of the present invention is equipped with, in order from the object side, a first lens group G1 possessing positive refractive power, a second lens group G2 possessing negative refractive power, and a third lens group G3 possessing positive refractive power; the aforesaid first lens group G1 comprises, in order from the object side, a front group G1F possessing positive refractive power and a rear group G1R possessing positive refractive power of the same order as the front group G1F; and focusing is carried out as a result of causing the aforesaid second lens group G2 to move along the optical axis.

Embodiment 1

FIG. 1 is a drawing showing a first embodiment of the present invention, the several lens groups being shown as they would be positioned when shooting a subject at an infinite distance. Focusing to accommodate an object at a short distance is carried out by causing the second lens group G2 to move toward the image side. Embodiment 1 comprises, in order from the object side, a first lens group G1 front group G1F, which comprises a biconvex lens L11, a biconvex lens L12, a biconcave lens L13, and a positive meniscus lens L14, which presents a convex surface toward the object side; a first lens group G1 rear group G1R, which comprises a cemented positive lens containing a negative meniscus lens L15, which presents a convex surface toward the object side, and a positive meniscus lens L16, which presents a convex surface toward the object side; a second lens group G2, which comprises a negative meniscus lens L21, which presents a convex surface toward the object side, and a cemented negative lens containing a positive meniscus lens L22, which presents a concave surface toward the object side, and a biconcave lens L23; a third lens group G3, which comprises an aperture stop S1, a cemented positive lens containing a biconvex lens L31 and a negative meniscus lens L32, which presents a concave surface toward the object side, and a biconvex lens L33; a field stop S2; and a filter. Moreover, there is also a filter provided at the object side of the first lens group G1.

Data values for the first embodiment of the present invention are presented in Table 1, which follows. At Table 1, F indicates the focal length of the entire lens system, F NO indicates F-number, β indicates magnification, Bf indicates back focus distance, and DO indicates distance (shooting distance) from the object to the surface at the object side of the first lens group G1 filter. In addition, the numbers at the left indicate the order of the lens surfaces as counted from the object, r indicates the radii of curvature of the lens surfaces, d indicates the distances between lens surfaces, nd and v respectively indicate refractive index and Abbe number at the d line ($\lambda$=587.6 nm), and Φ1 and Φ2 respectively indicate the effective diameters of biconvex lens L11 and negative meniscus lens L21, which presents a convex surface to the object side.

TABLE 1

F = 588.0
FNO = 2.88

| Surface No. | r | d | v | Nd | Φ |
|---|---|---|---|---|---|
| 1) | ∞ | 10.0000 | 64.10 | 1.516800 | |
| 2) | ∞ | 5.0000 | | | |
| 3) | 723.4505 | 16.0000 | 82.52 | 1.497820 | Φ1 = 204.2 |
| 4) | −1,580.8651 | 1.0000 | | | |
| 5) | 402.8552 | 26.0000 | 82.52 | 1.497820 | |
| 6) | −569.0512 | 3.0000 | | | |
| 7) | −567.4547 | 10.0000 | 45.37 | 1.796681 | |
| 9) | 247.5467 | 21.0000 | 82.52 | 1.497820 | |
| 10) | 684.5737 | 143.2000 | | | |
| 11) | 145.1942 | 6.8000 | 45.37 | 1.796681 | |
| 12) | 93.3223 | 24.0000 | 82.52 | 1.497820 | |
| 13) | 1,264.5949 | (d13 = variable) | | | |
| 14) | 391.7585 | 2.5000 | 45.37 | 1.796681 | Φ2 = 42.5 |
| 15) | 58.7467 | 4.4500 | | | |
| 16) | −291.7217 | 6.7000 | 25.41 | 1.805182 | |
| 17) | −57.0361 | 2.3000 | 57.53 | 1.670249 | |
| 18) | 129.9138 | (d18 = variable) | | | |
| 19> | (Aperture stop) | 1.7000 | | | |
| 20) | 213.8318 | 7.0000 | 82.52 | 1.497820 | |
| 21) | −73.1440 | 2.9000 | 45.37 | 1.796681 | |
| 22) | −257.8061 | 0.6000 | | | |
| 23) | 105.9097 | 5.5000 | 82.52 | 1.497820 | |
| 24) | −164.0386 | 12.0000 | | | |
| 25) | (Field stop) | 15.0000 | | | |
| 26) | ∞ | 2.0000 | 64.10 | 1.516800 | |
| 27) | ∞ | Bf | | | |

Variable Distance Values Assumed During Focusing Operations

| | Infinite Distance | Closest Focusing Distance |
|---|---|---|
| F, β | 588.0000 | −0.0708 |
| Do | ∞ | 8,480.9188 |
| d13 | 93.1433 | 103.9824 |
| d18 | 16.3494 | 5.5103 |
| Bf | 79.9386 | 79.9386 |

Values Corresponding to Conditional Expressions
(1) |f1·f3/(f2·F)|=1.00
(2) |f2·F|/(f1·Φ1)=0.55
(3) f1F/f1R=0.93
(4) Nn1−Np1=0.30
(5) vp1=82.52
(6) vn1=45.37
(7) Np3=1.49782
(8) vp3=82.52

Moreover, in the present embodiment, the effective diameter Φ2 of the second lens group G2 is 42.5, or approximately ⅕ of the effective diameter of the first lens group, making for a design of unprecedented compactness. Furthermore, the amount of lens group travel necessary for focusing is extremely small, only approximately 10.83 in travel being required to go from focus on an object at an infinite distance to focus on an object at the closest focusing distance.

Figure 2:
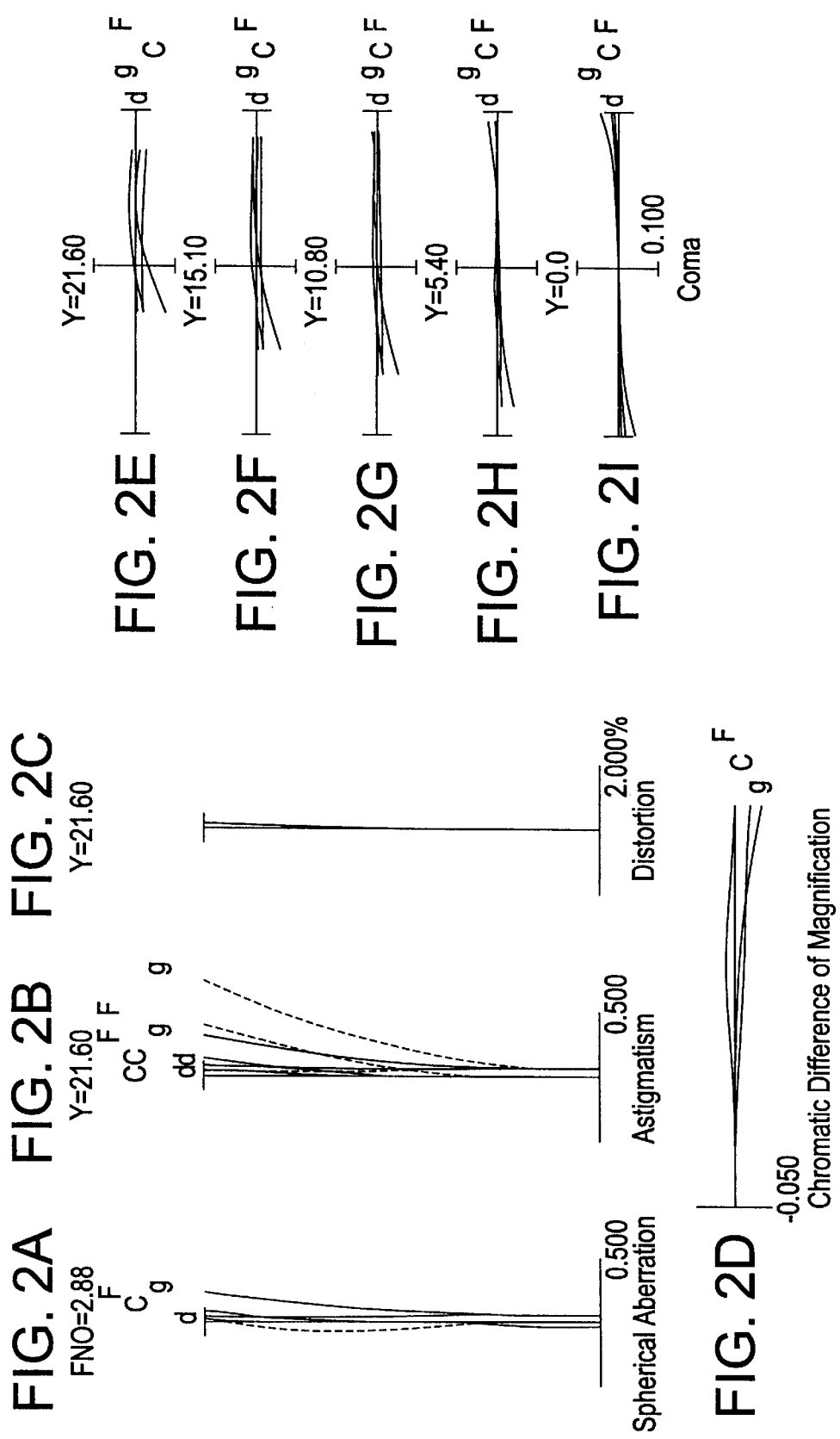
FIGS. 2A–2I contain curves showing various types of aberration for the first embodiment of the present invention when shooting a subject at an infinite distance.
Figure 3:
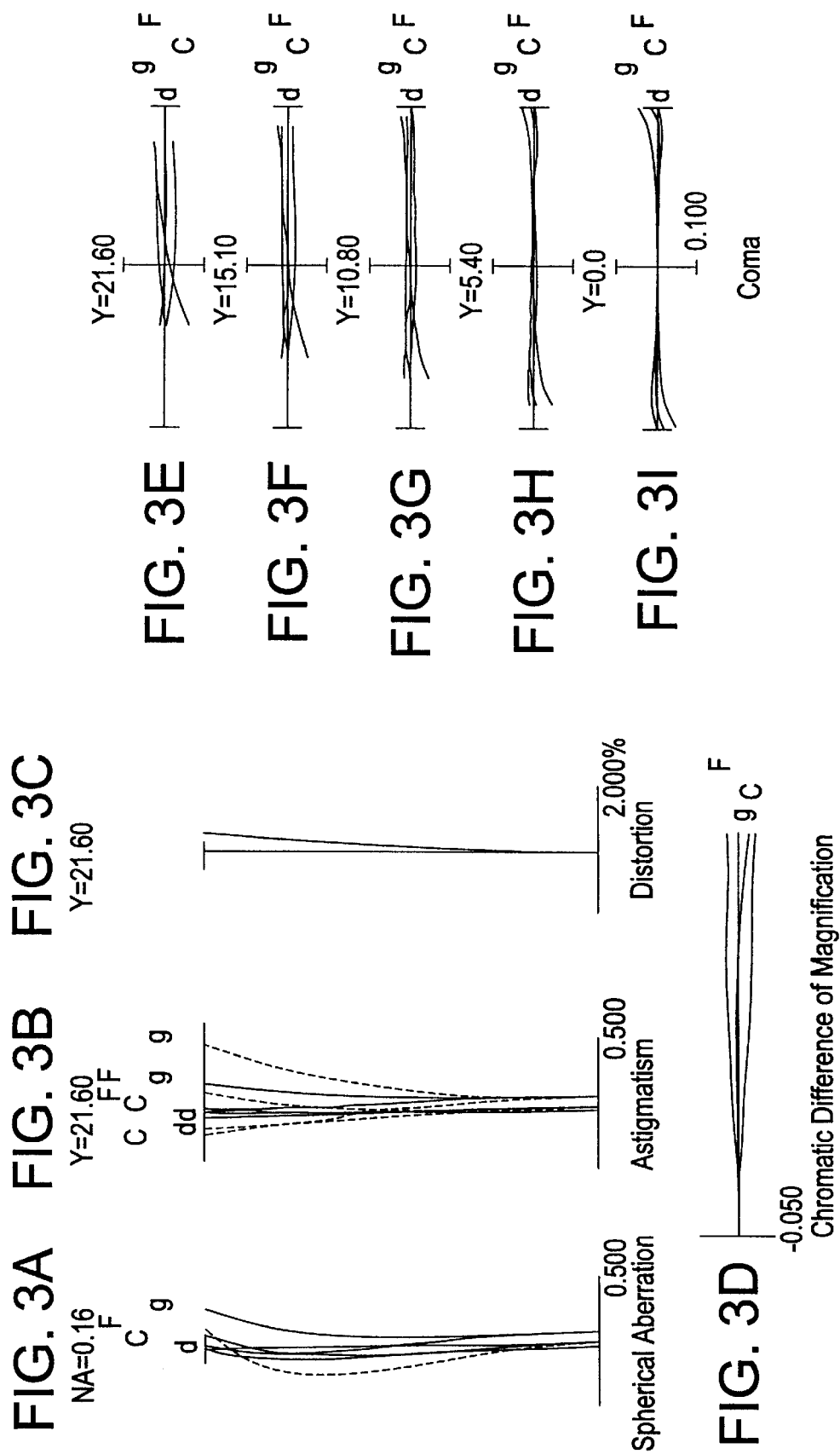
FIGS. 3A–3I contain curves showing various types of aberration for the first embodiment of the present invention when shooting a subject at the closest focusing distance.

FIG. 2 and FIG. 3 respectively show aberration curves when shooting a subject at an infinite distance and aberration curves when shooting a subject at the closest focusing distance (R=9,000 mm).

At the abjection curves, Y indicates image height, NA indicates numerical aperture, D indicates the d line (λ=587.6 nm), G indicates the g line (λ=435.6 nm), C indicates the c line (λ=656.3 nm), and F indicates the f line (λ=486.1 nm). Moreover, at the aberration curves showing astigmatism the solid line indicates the sagittal image plane, and the broken line indicates the meridional image plane. Furthermore, at the aberration curves showing spherical aberration the broken line indicates the amount of offense against the sine condition, and the aberration curves showing chromatic difference of magnification have been plotted with reference to the d line.

Embodiment 2

Figure 4:
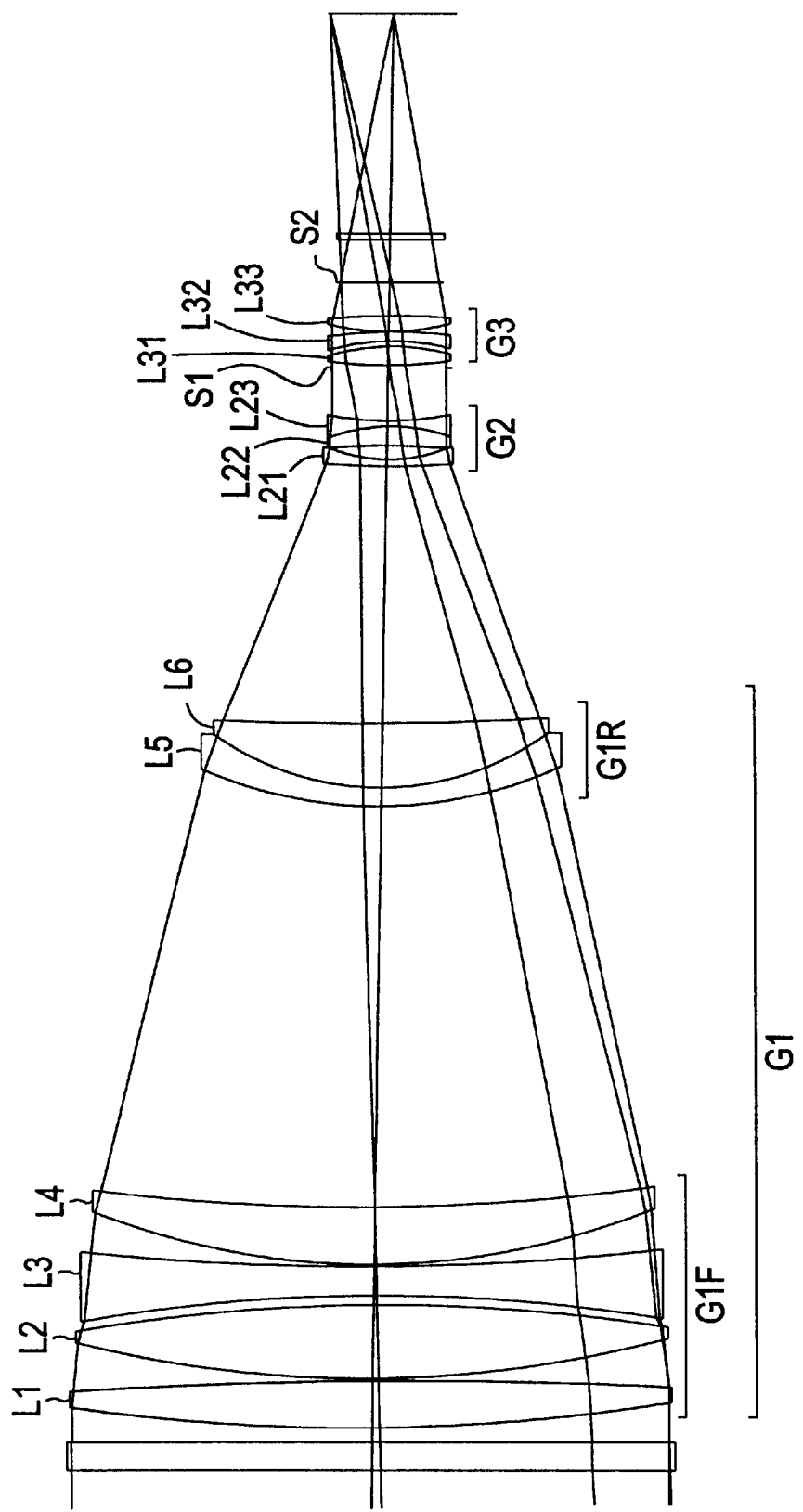
FIG. 4 is a drawing showing the constitution of a second embodiment of the present invention.

Next, FIG. 4 is a drawing showing a second embodiment of the present invention, the several lens groups being shown as they would be positioned when shooting a subject at an infinite distance. Focusing to accommodate an object at a short distance is carried out by causing the second lens group G2 to move toward the image side. Embodiment 2 comprises, in order from the object side, a first lens group G1 front group G1F, which comprises a biconvex lens L11, a biconvex lens L12, a biconcave lens L13, and a positive meniscus lens L14, which presents a convex surface toward the object side; a first lens group G1 rear group G1R, which comprises a cemented positive lens containing a negative meniscus lens L15, which presents a convex surface toward the object side, and a positive meniscus lens L16, which presents a convex surface toward the object side; a second lens group G2, which comprises a negative meniscus lens L21, which presents a convex surface toward the object side, and a cemented negative lens containing a positive meniscus lens L22, which presents a concave surface toward the object side, and a biconcave lens L23; a third lens group G3, which comprises an aperture stop S1, a biconvex lens L31, a negative meniscus lens L32, which presents a concave surface toward the object side, and a biconvex lens L33; a field stop S2; and a filter. Moreover, there is also a filter provided at the object side of the first lens group G1.

Data values for the second embodiment of the present invention are presented in Table 2, which follows. At Table 2, F indicates the focal length of the entire lens system, F NO indicates F-number, β indicates magnification, Bf indicates back focus distance, and DO indicates distance (shooting distance) from the object to the surface at the object side of the first lens group G1 filter. In addition, the numbers at the left indicate the order of the lens surfaces as counted from the object, r indicates the radii of curvature of the lens surfaces, d indicates the distances between lens surfaces, nd and v respectively indicate refractive index and Abbe number at the d line (λ=587.6 nm), and Φ1 and Φ2 respectively indicate the effective diameters of biconvex lens L11 and negative meniscus lens L21, which presents a convex surface to the object side.

TABLE 2

F = 588.0
FNO = 2.88

| Surface No. | r | d | v | Nd | Φ |
|---|---|---|---|---|---|
| 1) | ∞ | 10.0000 | 64.10 | 1.516800 | |
| 2) | ∞ | 5.0000 | | | |
| 3) | 777.3790 | 16.0000 | 82.52 | 1.497820 | Φ1 = 204.3 |
| 4) | −1.331.4947 | 1.0000 | | | |
| 5) | 457.2158 | 24.0000 | 82.52 | 1.497820 | |
| 6) | −563.9526 | 3.0000 | | | |
| 7) | −556.8448 | 10.0000 | 45.37 | 1.796681 | |
| 8) | 923.8516 | 1.0000 | | | |
| 9) | 240.4793 | 21.0000 | 82.52 | 1.497820 | |
| 10) | 688.5982 | 143.2000 | | | |
| 11) | 137.9034 | 6.8000 | 45.37 | 1.796681 | |
| 12) | 90.9017 | 24.0000 | 82.52 | 1.497820 | |
| 13) | 850.4092 | (d13 = variable) | | | |
| 14) | 517.7792 | 2.5000 | 45.37 | 1.796681 | Φ2 = 42.5 |
| 15) | 59.9165 | 4.4500 | | | |
| 16) | −304.6534 | 6.7000 | 25.41 | 1.805182 | |
| 17) | −54.3880 | 2.3000 | 57.53 | 1.670249 | |
| 18) | 129.9334 | (d18 = variable) | | | |
| 19> | (Aperture stop) | 1.7000 | | | |
| 20) | 169.7130 | 7.0000 | 82.52 | 1.497820 | |
| 21) | −68.8240 | 2.4000 | | | |
| 22) | −65.9739 | 2.9000 | 45.37 | 1.796681 | |
| 23) | −292.5412 | 0.6000 | | | |
| 24) | 117.8353 | 5.5000 | 82.52 | 1.497820 | |
| 25) | −123.7331 | 12.0000 | | | |
| 26) | (Field stop) | 15.0000 | | | |
| 27) | ∞ | 2.0000 | 64.10 | 1.516800 | |
| 28) | ∞ | Bf | | | |

Variable Distance Values Assumed During Focusing Operations

| | Infinite Distance | Closest Focusing Distance |
|---|---|---|
| F, β | 558.0000 | −0.07083 |
| Do | ∞ | 8,479.0180 |
| d13 | 97.40192 | 108.24308 |
| d18 | 16.26430 | 5.42314 |
| Bf | 77.26599 | 77.26599 |

Values Corresponding to Conditional Expressions

| (1) | $|f1·f3/(f2·F)|$ | = | 1.00 |
| (2) | $|f2·F|/(f1·\Phi1)$ | = | 0.55 |
| (3) | f1F/f1R | = | 0.98 |
| (4) | Nn1−Np1 | = | 0.30 |
| (5) | vp1 | = | 82.52 |
| (6) | vn1 | = | 45.37 |
| (7) | Np3 | = | 1.49782 |
| (8) | vp3 | = | 82.52 |

Moreover, in the present embodiment the effective diameter Φ2 of the second lens group G2 is 42.5, or approximately ⅕ of the effective diameter of the first lens group, making for a design of unprecedented compactness. Furthermore, the amount of lens group travel necessary for focusing is extremely small, only approximately 10.84 in travel being required to go from focus on an object at an infinite distance to focus on an object at the closest focusing distance.

Figure 5:
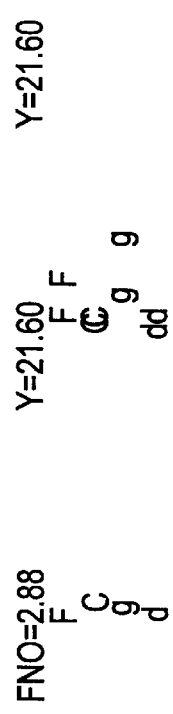
FIGS. 5A–5I contain curves showing various types of aberration for the second embodiment of the present invention when shooting a subject at an infinite distance.
Figure 6:
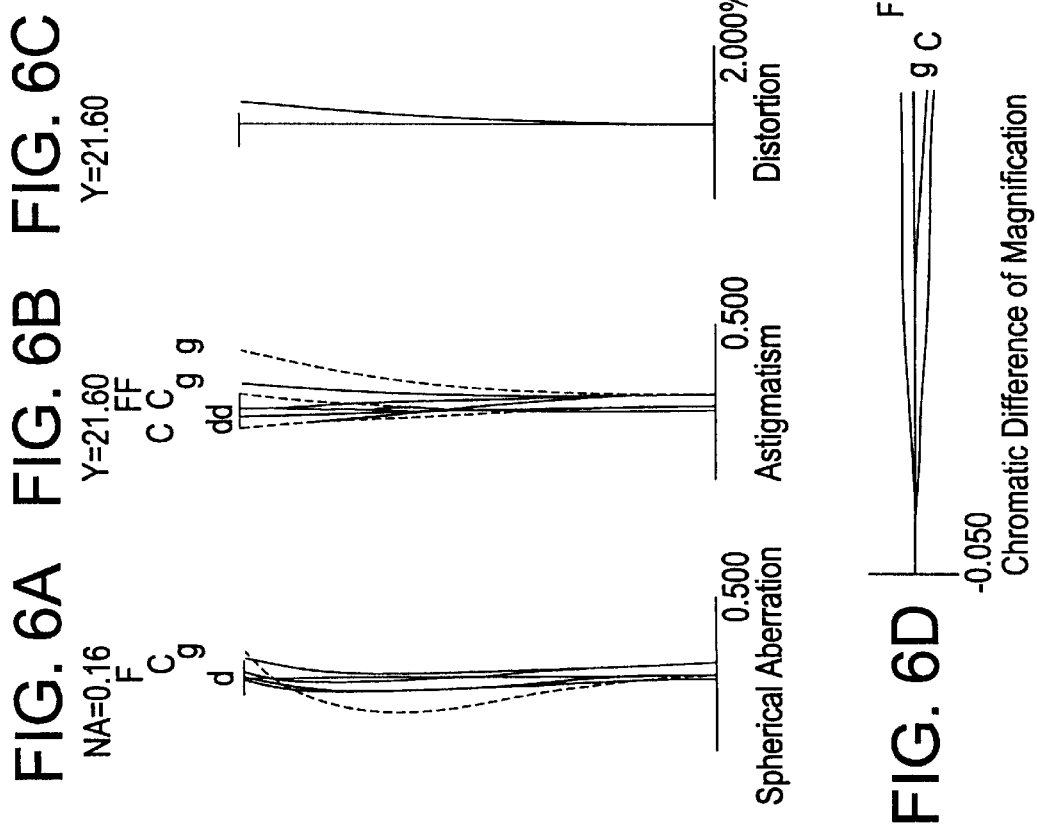
FIGS. 6A–6I contain curves showing various types of aberration for the second embodiment of the present invention when shooting a subject at the closest focusing distance.

FIG. 5 and FIG. 6 respectively show aberration curves when shooting a subject at an infinite distance and aberration curves when shooting a subject at the closest focusing distance (R=9,000 mm).

At the aberration curves, Y indicates image height, NA indicates numerical aperture, D indicates the d line (λ=587.6 nm), G indicates the g line (λ=435.6 nm), C indicates the c line (λ=656.3 nm), and F indicates the f line (λ=486.1 nm). Moreover, at the aberration curves showing astigmatism, the solid line indicates the sagittal image plane, and the broken line indicates the meridional image plane. Furthermore, at the aberration curves showing spherical aberration the broken line indicates the amount of offense against the sine condition, and the aberration curves showing chromatic difference of magnification have been plotted with reference to the d line.

Embodiment 3

Figure 7:
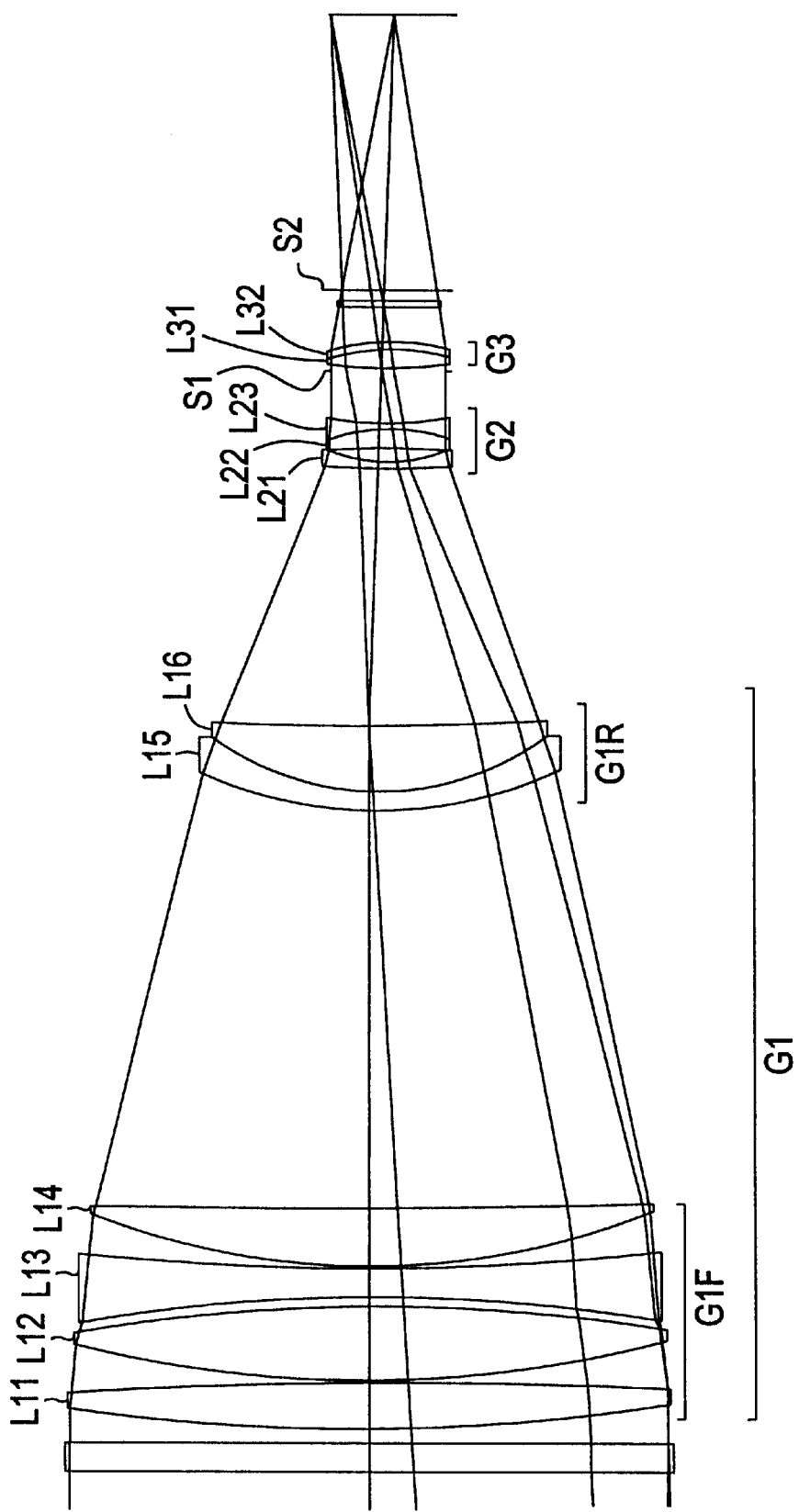
FIG. 7 is a drawing showing the constitution of a third embodiment of the present invention.

Furthermore, FIG. 7 is a drawing showing a third embodiment of the present invention, the several lens groups being shown as they would be positioned when shooting a subject at an infinite distance. Focusing to accommodate an object at a short distance is carried out by causing the second lens group G2 to move toward the image side. Embodiment 3 comprises, in order from the object side, a first lens group G1 front group G1F, which comprises a biconvex lens L11, a biconvex lens L12, a biconcave lens L13, and a positive meniscus lens L14, which presents a convex surface toward the object side; a first lens group G1 rear group G1R, which comprises a cemented positive lens containing a negative meniscus lens L15, which presents a convex surface toward the object side, and a positive meniscus lens L16, which presents a convex surface toward the object side; a second lens group G2, which comprises a negative meniscus lens L21, which presents a convex surface toward the object side, and a cemented negative lens containing a positive meniscus lens L22, which presents a concave surface toward the object side, and a biconcave lens L23; a positive third lens group G3, which comprises an aperture stop S1 and a cemented positive lens containing a biconvex lens L31 and a negative meniscus lens L32, which presents a concave surface toward the object side; a filter; and a field stop S2. Moreover, there is also a filter provided at the object side of the first lens group G1.

Data values for the third embodiment of the present invention are presented in Table 3, which follows. At Table 3, F indicates the focal length of the entire lens system, F NO indicates F-number, β indicates magnification, Bf indicates back focus distance, and DO indicates distance (shooting distance) from the object to the surface at the object side of the first lens group G1 filter. In addition, the numbers at the left indicate the order of the lens surfaces as counted from the object, r indicates the radii of curvature of the lens surfaces, d indicates the distances between lens surfaces, nd and ν respectively indicate refractive index and Abbe number at the d line (λ=587.6 nm), and Φ1 indicates the effective diameter of biconvex lens L11.

TABLE 3

F = 588.0
FNO = 2.88

| Surface No. | r | d | ν | Nd | Φ |
|---|---|---|---|---|---|
| 1) | ∞ | 10.0000 | 64.10 | 1.516800 | |
| 2) | ∞ | 5.0000 | | | |
| 3) | 890.2703 | 17.0000 | 82.52 | 1.497820 | Φ1 = 204.3 |
| 4) | −1,475.5997 | 1.0000 | | | |
| 5) | 479.2754 | 23.0000 | 82.52 | 1.497820 | |
| 6) | −646.4131 | 3.0000 | | | |
| 7) | −566.2888 | 10.0000 | 45.37 | 1.796681 | |
| 8) | 846.3629 | 1.0000 | | | |
| 9) | 243.5011 | 21.0000 | 82.52 | 1.497820 | |

TABLE 3-continued

F = 588.0
FNO = 2.88

| Surface No. | r | d | ν | Nd | Φ |
|---|---|---|---|---|---|
| 10) | 2,343.4498 | 143.1676 | | | |
| 11) | 129.8677 | 6.8000 | 45.37 | 1.796681 | |
| 12) | 85.1463 | 24.0000 | 82.52 | 1.497820 | |
| 13) | 515.7895 | (d13 = variable) | | | |
| 14) | 442.0439 | 3.0000 | 47.47 | 1.787971 | Φ2 = 43.9 |
| 15) | 71.8358 | 4.0000 | | | |
| 16) | −26,520.0300 | 7.0000 | 23.82 | 1.846660 | |
| 17) | −56.9239 | 3.0000 | 47.47 | 1.787971 | |
| 18) | 90.1383 | (d18 = variable) | | | |
| 19> | (Aperture stop) | 1.7000 | | | |
| 20) | 86.2567 | 9.0000 | 82.52 | 1.497820 | |
| 21) | −53.8868 | 2.4122 | 33.89 | 1.803840 | |
| 22) | −89.5510 | 15.0000 | | | |
| 23) | ∞ | 2.0000 | 64.10 | 1.516800 | |
| 24) | ∞ | 5.0000 | | | |
| 25) | (Field stop) | Bf | | | |

Variable Distance Values Assumed During Focusing Operations

| | Infinite Distance | Closest Focusing Distance |
|---|---|---|
| F, β | 588.0000 | −0.07089 |
| Do | ∞ | 8,481.7593 |
| d13 | 243.00000 | 253.85055 |
| d18 | 32.00000 | 21.14945 |
| Bf | 86.48390 | 86.48390 |

Values Corresponding to Conditional Expressions
(1) |f1·f3/(f2·F)|=1.00
(2) |f2·F|/(f1·Φ1)=0.55
(3) f1F/f1R=0.83
(4) Nn1−Np1=0.30
(5) νp1=82.52
(6) νn1=45.47
(7) Np3=1.49782
(8) νp3=82.52

Moreover, in the present embodiment, the effective diameter Φ2 of the second lens group G2 is 43.9, or approximately ⅕ of the effective diameter of the first lens group, making for a design of unprecedented compactness. Furthermore, the amount of lens group travel necessary for focusing is extremely small, only approximately 10.85 in travel being required to go from focus on an object at an infinite distance to focus on an object at the closest focusing distance.

FIG. 8 and FIG. 9 respectively show aberration curves when shooting a subject at an infinite distance and aberration curves when shooting a subject at the closest focusing distance (R=9,000 mm).

At the aberration curves, Y indicates image height, NA indicates numerical aperture, D indicates the d line (λ=587.6 nm), G indicates the g line (λ=435.6 nm), C indicates the c line (λ=656.3 nm), and F indicates the f line (λ=486.1 nm). Moreover, at the aberration curves showing astigmatism, the solid line indicates the sagittal image plane, and the broken line indicates the meridional image plane. Furthermore, at the aberration curves showing spherical aberration the broken line indicates the amount of offense against the sine condition, and the aberration curves showing chromatic difference of magnification have been plotted with reference to the d line.

Embodiment 4

Figure 10:
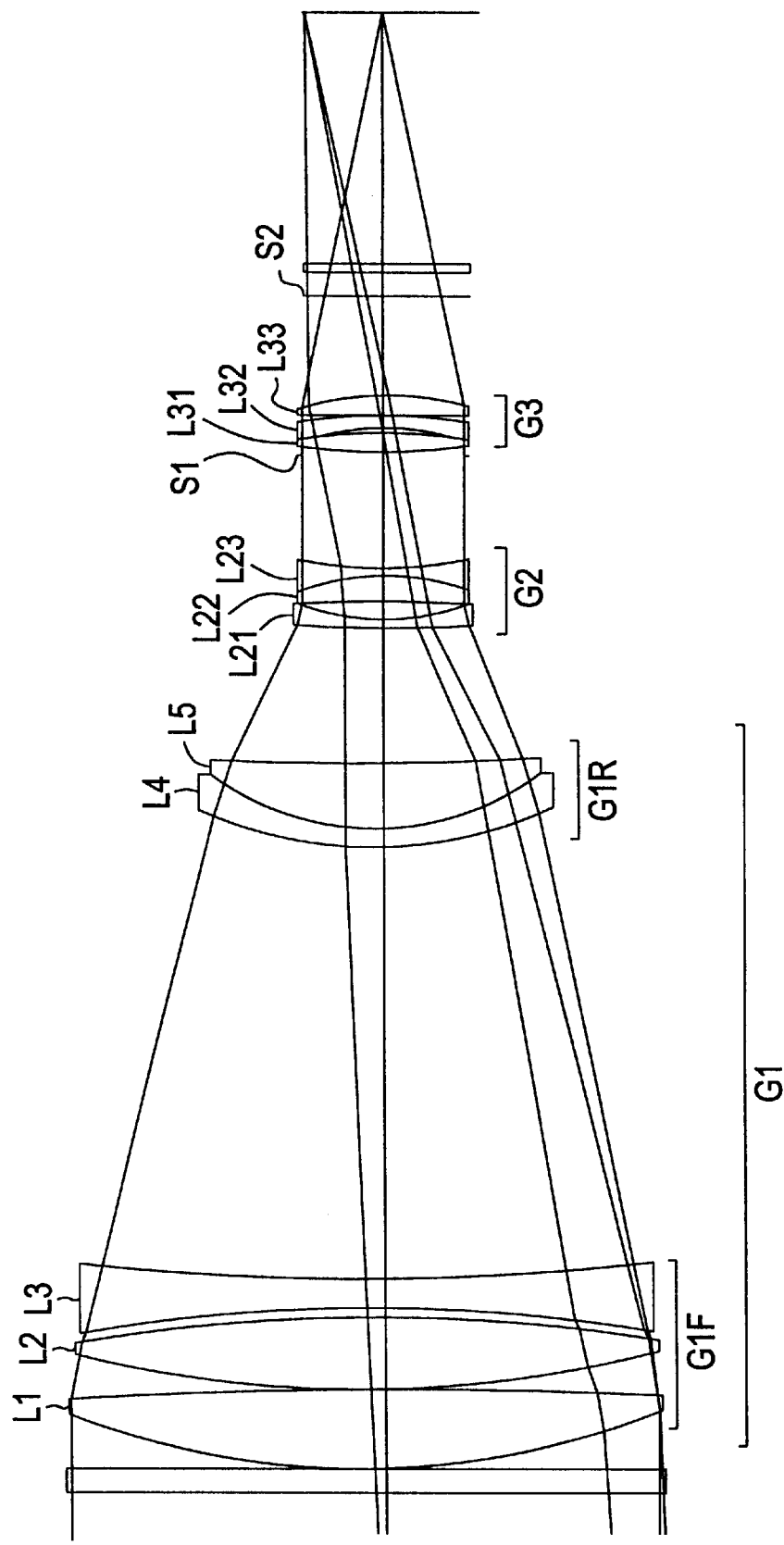
FIG. 10 is a drawing showing the constitution of a fourth embodiment of the present invention.

In addition, FIG. 10 is a drawing showing a fourth embodiment of the present invention, the several lens groups being shown as they would be positioned when shooting a subject at an infinite distance. Focusing to accommodate an object at a short distance is carried out by causing the second lens group G2 to move toward the image side. Embodiment 4 is constituted from, in order from the object side, a first lens group G1 front group G1F, which comprises a biconvex lens L11, a biconvex lens L12, and a biconcave lens L13; a first lens group G1 rear group G1R, which comprises a cemented positive lens containing a negative meniscus lens L14, which presents a convex surface toward the object side, and a positive meniscus lens L15, which presents a convex surface toward the object side; a second lens group G2, which comprises a biconcave lens L21 and a cemented negative lens containing a positive meniscus lens L22, which presents a concave surface toward the object side, and a negative meniscus lens L23, which presents a concave surface toward the object side; a third lens group G3, which comprises an aperture stop S1, a biconvex lens L31, a negative meniscus lens L32, which presents a concave surface toward the object side, and a biconvex lens L33; a field stop S2; and a filter. Moreover, there is also a filter provided at the object side of the first lens group G1.

A list of data values for the fourth embodiment of the present invention is presented in Table 4, which follows. At Table 4, F indicates the focal length of the entire lens system, F NO indicates F-number, β indicates magnification, Bf indicates back focus distance, and DO indicates distance (shooting distance) from the object to the surface at the object side of the first lens group G1 filter. In addition, the numbers at the left indicate the order of the lens surfaces as counted from the object, r indicates the radii of curvature of the lens surfaces, d indicates the distances between lens surfaces, nd and ν respectively indicate refractive index and Abbe number at the d line (λ=587.6 nm), and Φ1 indicates the effective diameter of biconvex lens L11.

TABLE 4

F = 392.0
FNO = 2.88

| Surface No. | r | d | ν | Nd | Φ |
|---|---|---|---|---|---|
| 1) | ∞ | 5.0000 | 64.10 | 1.516800 | |
| 2) | ∞ | 1.0000 | | | |
| 3) | 187.1041 | 20.1000 | 82.52 | 1.497820 | Φ1 = 136.2 |
| 4) | −746.4748 | 0.6000 | | | |
| 5) | 200.0582 | 20.1000 | 82.52 | 1.497820 | |
| 6) | −396.5666 | 2.1000 | | | |
| 7) | −372.8865 | 7.0000 | 47.47 | 1.787971 | |
| 8) | 357.8219 | 106.4000 | | | |
| 9) | 78.1740 | 4.6000 | 45.37 | 1.796681 | |
| 10) | 52.6200 | 17.0000 | 82.52 | 1.497820 | |
| 11) | 699.2100 | (d11 = variable) | | | |
| 12) | −490.7080 | 2.5000 | 33.89 | 1.803840 | Φ2 = 43.4 |
| 13) | 67.8590 | 4.4500 | | | |
| 14) | −227.9240 | 6.7000 | 25.41 | 1.805182 | |
| 15) | −45.1530 | 2.3000 | 60.03 | 1.640000 | |
| 16) | 155.4560 | (d16 = variable) | | | |
| 17> | (Aperture stop) | 1.3000 | | | |
| 18) | 263.7550 | 4.6000 | 55.60 | 1.696800 | |
| 19) | −128.7030 | 2.2400 | | | |
| 20) | −58.3970 | 2.9000 | 33.89 | 1.803840 | |
| 21) | −172.8630 | 0.6000 | | | |
| 22) | 46,400.0000 | 5.5000 | 60.03 | 1.640000 | |
| 23) | −66.6800 | 22.0000 | | | |
| 24) | (Field stop) | 7.2000 | | | |

TABLE 4-continued

F = 392.0
FNO = 2.88

| Surface No. | r | d | ν | Nd | Φ |
|---|---|---|---|---|---|
| 25) | ∞ | 2.0000 | 64.10 | 1.516800 | |
| 26) | ∞ | Bf | | | |

Variable Distance Values Assumed During Focusing Operations

| | Infinite Distance | Closest Focusing Distance |
|---|---|---|
| F, β | 392.0000 | −0.11789 |
| Do | ∞ | 3,416.2345 |
| d13 | 24.59533 | 35.45378 |
| d18 | 27.44354 | 16.58509 |
| Bf | 83.53862 | 83.53862 |

Values Corresponding to Conditional Expressions
(1) |f1·f3/(f2·F)|=1.00
(2) |f2·F|/(f1·Φ1)=0.85
(3) f1F/f1 R=1.29
(4) Nn1−Np1=0.294
(5) νp1=82.52
(6) νn1=47.47, 45.37
(7) Np3=1.69680, 1.64000
(8) νp3=55.60, 60.03

Moreover, in the present embodiment, the effective diameter Φ2 of the second lens group G2 is 43.4, or ⅓ or less of the effective diameter of the first lens group, making for a design that is more compact than has existed previously. Furthermore, the amount of lens group travel necessary for focusing is extremely small, only approximately 10.86 in travel being required to go from focus on an object at an infinite distance to focus on an object at the closest focusing distance.

FIG. 11 and FIG. 12 respectively show aberration curves when shooting a subject at an infinite distance and aberration curves when shooting a subject at the closest focusing distance (R=3,800 mm).

At the aberration curves, Y indicates image height, NA indicates numerical aperture, D indicates the d line (λ=587.6 nm), G indicates the g line (λ=435.6 nm), C indicates the c line (λ=656.3 nm), and F indicates the f line (λ=486.1 nm). Moreover, at the aberration curves showing astigmatism, the solid line indicates the sagittal image plane, and the broken line indicates the meridional image plane. Furthermore, at the aberration curves showing spherical aberration the broken line indicates the amount of offense against the sine condition, and the aberration curves showing chromatic difference of magnification have been plotted with reference to the d line.

What is claimed is:

1. A large-relative-aperture internal focusing supertelephoto lens comprising, in order from the object side:

a first lens group G1 possessing positive refractive power and comprising, in order from the object side, a front group G1F possessing positive refractive power and a rear group G1R possessing positive refractive power of the same order as the aforesaid front group G1F;

a second lens group G2 possessing negative refractive power that carries out focusing as result of movement along an optical axis;

and a third lens group G3 possessing positive refractive power;

wherein the following conditional expressions are satisfied:

$$0.7 < |f1 \cdot f3/(f2 \cdot F)| < 1.3,$$

$$0.4 < |f2 \cdot F|/(f1 \cdot \Phi 1) < 1.0,$$

and $$0.7 < f1F/f1R < 1.4;$$

where:
- f1=Focal length of the aforesaid first lens group G1,
- f2=Focal length of the aforesaid second lens group G2,
- f3=Focal length of the aforesaid third lens group G3,
- f1F=Focal length of the aforesaid front group within the first lens group G1,
- f1R=Focal length of the aforesaid rear group within the first lens group G1,
- F=Focal length of the entire lens system, and
- $\Phi$1=Effective diameter of the lens surface at the object-most side of the aforesaid first lens group.

2. A large-relative-aperture internal focusing supertelephoto lens according to claim 1, wherein the aforesaid front group G1F within the first lens group G1 comprises, in order from the object side, a positive lens component, a positive lens component, and a negative lens component;

the aforesaid rear group G1R within the first lens group G1 comprises a negative lens component and a positive lens component; and the following conditional expressions are satisfied:

$$0.2 < Nn1 - Np1 < 0.4,$$

$$65 < vp1 < 100,$$

and $$35 < vn1 < 60;$$

where:
- Np1=Average refractive index at the d line ($\lambda$=587.6 nm) of the aforesaid positive lens components of the first lens group G1,
- vp1=Abbe number of each positive lens component of the first lens group G1,
- Nn1=Average refractive index at the d line of the aforesaid negative lens components of the first lens group G1, and
- vn1=Abbe number of each negative lens component of the first lens group G1.

3. A large-relative-aperture internal focusing supertelephoto lens according to claim 2, wherein the aforesaid front group G1F within the first lens group G1 comprises, in order from the object side,
a positive lens component L11, a positive lens component L12, a negative lens component L13, and a positive lens component L14;

the aforesaid rear group G1R within the first lens group G1 comprises
a negative lens component L15 and a positive lens component L16;

and the aforesaid third lens group G3 comprises at least one positive lens component and satisfies the following conditional expressions:

$$1.4 < Np3 < 1.65,$$

and $$60 < vp3 < 100;$$

where:
- Np3=Refractive index at the d line ($\lambda$=587.6 nm) of each positive lens component of the third lens group G3, and
- vp3=Abbe number of each positive lens component of the third lens group G3.

4. A large-relative-aperture internal focusing supertelephoto lens according to claim 3, wherein the aforesaid third lens group G3 comprises, in order from the object side,
a positive lens component L31, a negative lens component L32, and a positive lens component L33.

5. A large-relative-aperture internal focusing supertelephoto lens according to claim 3, wherein the aforesaid third lens group G3 comprises a cemented positive lens comprising, in order from the object side,
a positive lens component L31 and a negative lens component L32.

6. A large-relative-aperture internal focusing supertelephoto lens according to claim 2, wherein the aforesaid front group G1F within the first lens group G1 comprises, in order from the object side,
a positive lens component L11, a positive lens component L12, and a negative lens component L13;

the aforesaid rear group G1R within the first lens group G1 comprises
a negative lens component L14 and a positive lens component L15;

and the aforesaid third lens group G3 comprises at least one positive lens component and satisfies the following conditional expressions:

$$1.55 < Np3 < 1.75,$$

and $$45 < vp3 < 70$$

where:
- Np3=Refractive index at the d line ($\lambda$=587.6 nm) of each positive lens component of the third lens group G3, and
- vp3=Abbe number of each positive lens component of the third lens group G3.

7. A large-relative-aperture internal focusing supertelephoto lens according to claim 6, wherein the aforesaid third lens group G3 comprises, in order from the object side,
a positive lens component L31, a negative lens component L32, and a positive lens component L33.

8. A large-relative-aperture internal focusing supertelephoto lens according to claim 6, wherein the aforesaid third lens group G3 comprises, in order from the object side,
a cemented positive lens comprising a positive lens component L31 and a negative lens component L32.

9. A large-relative-aperture internal focusing supertelephoto lens according to claim 1, wherein the aforesaid front group G1F within the first lens group G1 comprises, in order from the object side,
a positive lens component L11, a positive lens component L12, a negative lens component L13, and a positive lens component L14;
the aforesaid rear group G1R within the first lens group G1 comprises
a negative lens component L15 and a positive lens component L16;
and the aforesaid third lens group G3 comprises at least one positive lens component and satisfies the following conditional expressions:

1.4<$Np3$<1.65, and

60<$vp3$<100;

where:
Np3=Refractive index at the d line (λ=587.6 nm) of each positive lens component of the third lens group G3, and
vp3=Abbe number of each positive lens component of the third lens group G3.

10. A large-relative-aperture internal focusing supertelephoto lens according to claim 9, wherein
the aforesaid third lens group G3 comprises, in order from the object side,
a positive lens component L31, a negative lens component L32, and a positive lens component L33.

11. A large-relative-aperture internal focusing supertelephoto lens according to claim 9, wherein
the aforesaid third lens group G3 comprises a cemented positive lens comprising, in order from the object side, a positive lens component L31 and a negative lens component L32.

12. A large-relative-aperture internal focusing supertelephoto lens according to claim 1, wherein
the aforesaid front group G1F within the first lens group G1 comprises, in order from the object side,
a positive lens component L11, a positive lens component L12, and a negative lens component L13;
the aforesaid rear group G1R within the first lens group G1 comprises
a negative lens component L14 and a positive lens component L15;
and the aforesaid third lens group G3 comprises at least one positive lens component and satisfies the following conditional expressions:

1.55<$Np3$<1.75, and

45<$vp3$<70 where:
N3=Refractive index at the d line (λ=587.6 nm) of each positive lens component of the third lens group G3, and
vp3=Abbe number of each positive lens component of the third lens group G3.

13. A large-relative-aperture internal focusing supertelephoto lens according to claim 12, wherein
the aforesaid third lens group G3 comprises, in order from the object side,
a positive lens component L31, a negative lens component L32, and a positive lens component L33.

14. A large-relative-aperture internal focusing supertelephoto lens according to claim 13, wherein
the aforesaid third lens group G3 comprises a cemented positive lens comprising, in order from the object side, a positive lens component L31 and a negative lens component L32.

15. A large-relative-aperture internal focusing supertelephoto lens comprising, in order from the object side:
a first lens group G1 possessing positive refractive power and consisting of, in order from the object side, a front group G1F possessing positive refractive power and a rear group G1R possessing positive refractive power of the same order as the aforesaid front group G1F;
a second lens group G2 possessing negative refractive power that carries out focusing as result of movement along an optical axis;
and a third lens group G3 possessing positive refractive power;
wherein the following conditional expressions are satisfied:

0.7<|$f1·f3/(f2·F)$|<1.3, 0.4<|$f2·F1/(f1·\Phi)$|<1.0, and 0.7<$f1F/f1R$<1.4, where:
f1=Focal length of the aforesaid first lens group G1,
f2=Focal length of the aforesaid second lens group G2,
f3=Focal length of the aforesaid third lens group G3,
f1F=Focal length of the aforesaid front group within the first lens group G1,
f1R=Focal length of the aforesaid rear group within the first lens group G1,
F=Focal length of the entire lens system, and
Φ1=Effective diameter of the lens surface at the objectmost side of the aforesaid first lens group.

* * * * *